United States Patent [19]

Kobayashi et al.

[11] Patent Number: 4,589,299
[45] Date of Patent: May 20, 1986

[54] REDUCTION MOTOR SHAFT PROVIDED WITH SCREW TYPE DOUBLE

[75] Inventors: Kyoji Kobayashi, Chigasaki; Atsushi Inagaki, Zama, both of Japan

[73] Assignee: Jidosha Denki Kogyo Kabushiki Kaisha, Kanagawa, Japan

[21] Appl. No.: 623,300

[22] Filed: Jun. 22, 1984

[30] Foreign Application Priority Data

Jun. 23, 1983 [JP] Japan .............................. 58-95729[U]

[51] Int. Cl.$^4$ ...................... F16H 55/17; F16H 55/22; F16H 1/16; F16H 1/20
[52] U.S. Cl. ....................................... 74/458; 74/427; 74/425; 74/424.7
[58] Field of Search ............ 74/424.7, 424.8 R, 424.5, 74/458, 457, 425, 414; 29/159.2

[56] References Cited

U.S. PATENT DOCUMENTS

| | | | |
|---|---|---|---|
| 3,481,215 | 12/1969 | Howell | 74/458 |
| 3,581,355 | 6/1971 | Schaub | 74/458 |
| 4,282,767 | 8/1981 | Guichard | 74/427 |
| 4,369,387 | 1/1983 | Haar et al. | 74/427 |
| 4,444,071 | 4/1984 | Guichard | 74/427 |

Primary Examiner—Lawrence J. Staab
Assistant Examiner—Michael D. Bednarek
Attorney, Agent, or Firm—Sughrue, Mion, Zinn, Macpeak, and Seas

[57] ABSTRACT

A reduction motor shaft used, for example, in a wiper motor is disclosed, which is provided with screw type double worms constituting a reduction mechanism part. In this reduction motor shaft, right-handed and left-handed screw type worms are coaxially formed in one end side of the shaft as plural-thread screws at a linked state of tooth profiles of both worms, and further an annular protrusion is formed in a threading boundary between the worms.

3 Claims, 5 Drawing Figures

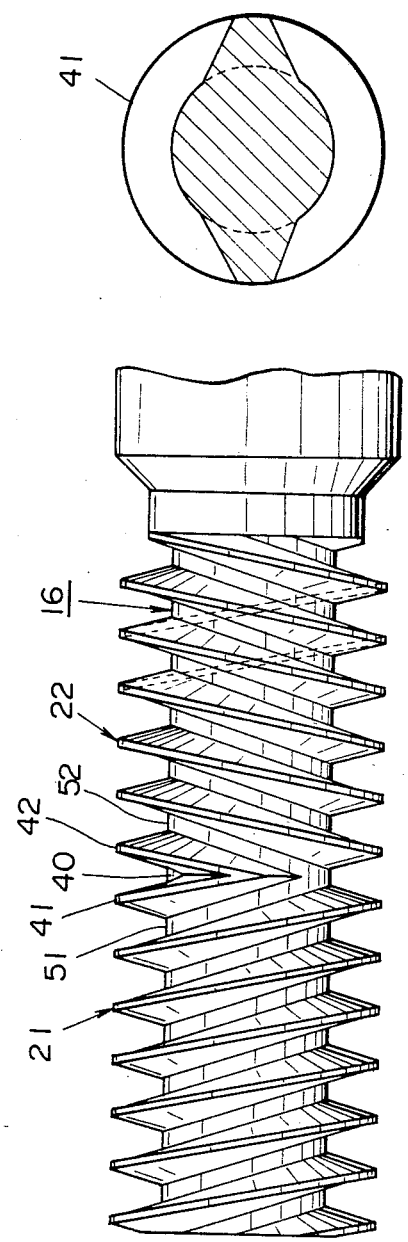
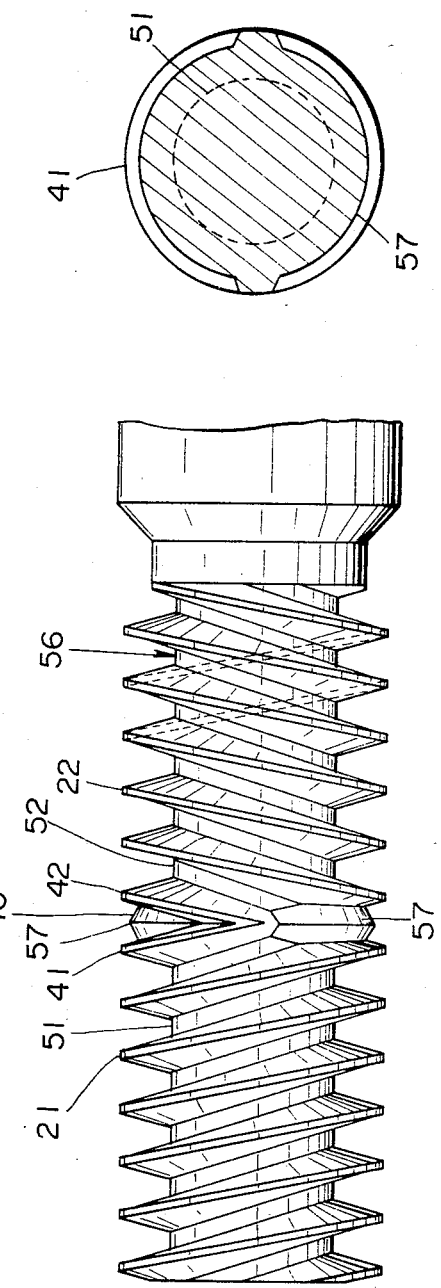
FIG. 2 (a)  FIG. 2 (b)
FIG. 3 (a)  FIG. 3 (b)

4,589,299

REDUCTION MOTOR SHAFT PROVIDED WITH SCREW TYPE DOUBLE

BACKGROUND OF THE INVENTION

1. Field of the Invention

This invention relates to a reduction motor shaft provided with screw type double worms constituting a reduction mechanism part.

2. Description of the Prior Art

As a motor having a reduction motor shaft provided with screw type double worms for the reduction mechanism, for instance, there is a wiper motor as shown in FIGS. 1 and 2. This wiper motor 11 comprises a motor yoke 12, a field magnet 13 fixed to the inner wall of the yoke 12, an armature 14 rotatably arranged inside the field magnet 13, a commutator 15 supplying an electric current to the armature 14, a reduction motor shaft 16 fixing the armature 14 and commutator 15, and a carbon brush 17 contacting with the commutator 15, in which the carbon brush 17 is attached to a fit portion between motor yoke 12 and gear housing 18. Moreover, numeral 19 is a cover for the gear housing 18.

Onto one end side of the reduction motor shaft 16 (left-hand side of FIG. 1) are coaxially formed a right-handed screw type worm 21 and a left-handed screw type worm 22 as one body. These right-handed and left-handed screw type worms 21 and 22 are double-thread screws, and tooth profiles of the worms 21 and 22 are linked with each other. Further, the worms 21 and 22 are engaged with worm wheels 23 and 24 pivoted in the gear housing 18, respectively, while pinions 23a and 24a integrally united with the worm wheels 23 and 24 are engaged with a common toothed wheel 25 pivoted in the gear housing 18 to thereby construct a reduction mechanism part 26, whereby a wiper blade (not shown) is subjected to a reciprocating oscillation or a rotating movement through a reduction shaft (not shown) connected to the wheel 25.

The reduction motor shaft 16 is fitted into an oil-containing bearing 31 arranged between the commutator 15 and the worm 22. The bearing 31 is supported by the housing 18 and a bearing support member 32.

The other end side of the reduction motor shaft 16 (right-hand side of FIG. 1) passes through an oil-containing bearing 34 retained by a bearing support member 33 and protrudes from the yoke 12. To this end of the shaft 16 is fitted a self-cooling fan 35 through a nut 36. A fan cover 37 provided with a plurality of air inlet holes 37a is fixed to the yoke 12 by means of screw bolts so as to surround the self-cooling fan 35 in such a manner a ventilation passage 39 is formed between the outer surface of the yoke 12 and the fan cover 37.

In the reduction motor shaft 16 of the above construction, the right-handed screw type worm 21 and the left-handed screw type worm 22 are coaxially formed as a double-thread screw on the reduction motor shaft 16 and also the tooth profiles of the worms 21 and 22 are linked with each other, so that a direction of thrust produced in the shaft 16 by engaging the right-handed screw type worm 21 with the worm wheel 23 is opposite to a direction of thrust produced in the shaft 16 by engaging the left-handed screw type worm 22 with the worm wheel 24, and consequently these thrusts produced in the reduction motor shaft 16 are offset with each other. As a result, it is not substantially necessary to give a function supporting the thrust to the oil-containing bearings 31 and 34, so that the shaft 16 is sufficiently simple in the structure.

In the reduction motor shaft 16 provided with conventional screw type double worms, however, when the screw of the worms 21 and 22 are formed from a threading boundary 40 by rolling, the material for the reduction motor shaft 16 is abruptly rolled in a direction from addendums 41, 42 to dedendums 51, 52 as shown in FIG. 2, so that the rolling pressure becomes excessive, which is particularly apt to cause deformation in the vicinity of the threading boundary 40. As a result, failures such as deformation, bending, breaking and the like are caused on the longitudinal axis of the reduction motor shaft 16.

SUMMARY OF THE INVENTION

It is, therefore, an object of the invention to solve the aforementioned problem of the prior art, and to provide a structure of a reduction motor shaft provided with screw type double worms constituting a reduction mechanism part, which can be produced by the rolling in a high productivity and a high accuracy without applying an excessive force to the threading boundary between right-handed screw type worm and left-handed screw type worm during the rolling and without causing failures such as warpage of longitudinal axis between both the worms, deformation, bending, breaking and the like.

According to the invention, there is the provision of a reduction motor shaft provided with screw type double worms constituting a reduction mechanism part, characterized in that a right-handed screw type worm and a left-handed screw type worm are coaxially formed on one end side of the reduction motor shaft as a plural-thread screw while linking tooth profiles of both the worms with each other, and at the same time an annular protrusion is formed in a threading boundary between the right-handed screw type worm and the left-handed screw type worm.

BRIEF DESCRIPTION OF THE DRAWING

The invention will now be described with reference to the accompanying drawing, wherein:

FIG. 2(a) is an enlarged front view of the reduction motor shaft shown in FIG. 1;

FIG. 2(b) is a sectional view of the threading boundary between the worms of FIG. 2(a);

FIG. 3(a) is an enlarged front view of an embodiment of the reduction motor shaft provided with the screw type double worms according to the invention; and FIG. 3(b) is a sectional view of the threading boundary between both the worms shown in FIG. 3a.

DESCRIPTION OF THE PREFERRED EMBODIMENTS

Figure 1:
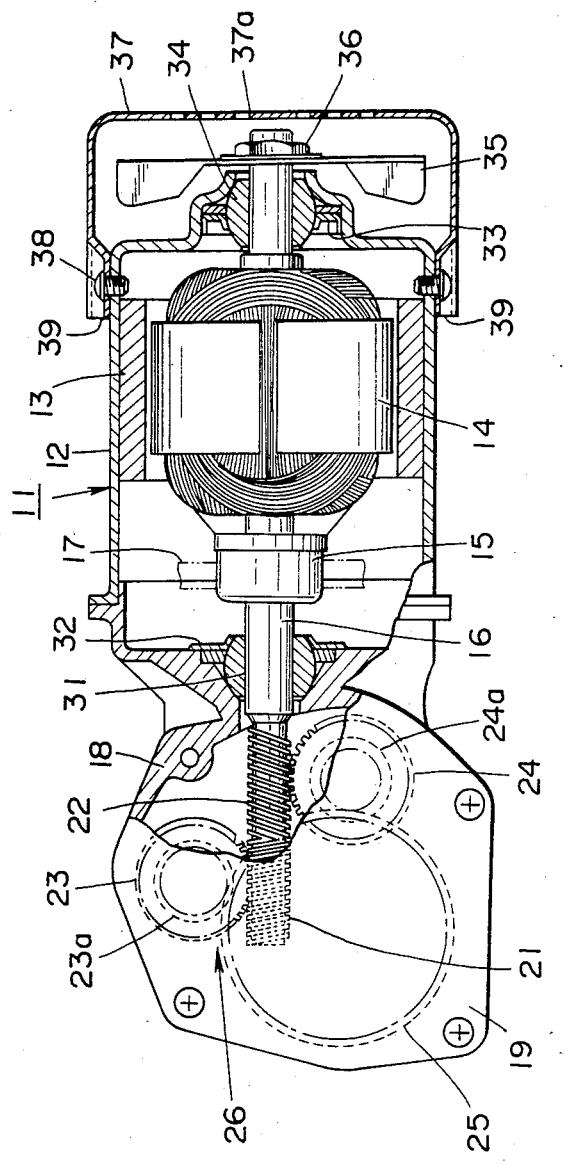
FIG. 1 is a schematically front view partly shown in section of an embodiment of the motor having the reduction motor shaft provided with the screw type double worms.

In FIG. 3 is shown an embodiment of the reduction motor shaft according to the invention, which is usable as a reduction motor shaft for wiper motor 11 as shown in FIG. 1. A right-handed screw type worm 21 and left-handed screw type worm 22 are coaxially formed on one end side of the reduction motor shaft 56 as one body. In the illustrated embodiment, the right-handed screw type worm 21 and the left-handed screw type worm 22 are double-thread screws, respectively, and the tooth profiles of both worms 21 and 22 are linked with each other. Furthermore, an annular protrusion 57 having a diameter equal to or slightly smaller than the diameter of addendums 41, 42 is formed in a threading boundary 40 between the right-handed screw type worm 21 and the left-handed screw type worm 22. In the illustrated embodiment, the annular protrusion 57 has a triangular shape in section. The sectional shape of the annular protrusion is not restricted to the triangle, and may be spherical, parabolic, cylindrical or other proper form.

Since the annular protrusion 57 having the diameter equal to or smaller than that of the addendums 41, 42 is formed in the threading boundary 40 between the right-handed screw type worm 21 and the left-handed screw type worm 22 on the reduction motor shaft 56, the rolling of the threading boundary 40 can be performed without applying the excessive force in the formation of the threading boundary 40 between the worms 21 and 22 as shown in FIG. 3. As a result, the reduction motor shaft 56 provided with the screw type double worms can be manufactured in a high accuracy without causing the warpage of longitudinal axis between the right-handed screw type worm 21 and the left-handed screw type worm 22, deformation, bending, breaking and the like.

Although the right-handed screw type worm 21 and the left-handed screw type worm 22 are double-thread screws in the illustrated embodiment, they may be plural-thread screw by increasing the threading number.

Further, the illustrated embodiment is explained with respect to the reduction motor shaft for the wiper motor, but it is a matter of course that the invention is not restricted to such an application.

As mentioned above, according to the invention, the reduction motor shaft provided with worms constituting the reduction mechanism part is so constructed that the right-handed screw type worm and the left-handed screw type worm are coaxially formed as plural-thread screw on the reduction motor shaft while linking the tooth profiles of these worms with each other, and at the same time the annular protrusion is formed in the threading boundary between both the worms. Therefore, when the reduction motor shaft is formed, for example, by the rolling, the exessive force based on the rolling pressure is not applied to the threading boundary between the right-handed screw type worm and the left-handed screw type worm, and also there is caused no failure such as the warpage of longitudinal axis between the worms, deformation, bending, breaking or the like. As a result, the invention has an industrially great merit that the reduction motor shaft provided with the screw type double worms can stably and cheaply be produced by the rolling in high productivity and high accuracy.

What is claimed is:

1. A reduction motor shaft comprising first and second multiple start worm screw portions having threads of opposite hand disposed adjacent each other at one end of the shaft with the threads of both worm screw portions being linked with each other at the boundary between said worm screw portions and an annular protrusion disposed at said boundary with said linked threads intersecting said annular protrusion.

2. A reduction motor shaft according to claim 1 wherein said annular protrusion has a diameter equal to or slightly less than the external diameter of said threads.

3. A reduction motor shaft according to claim 1 wherein said annular protrusion has a triangular shape in section.

* * * * *